United States Patent
Guy

(10) Patent No.: US 7,319,819 B2
(45) Date of Patent: Jan. 15, 2008

(54) SUPPRESSION OF FOUR-WAVE MIXING IN ULTRA DENSE WDM OPTICAL COMMUNICATION SYSTEMS THROUGH OPTICAL FIBRE DISPERSION MAP DESIGN

(75) Inventor: Martin John Guy, London (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 702 days.

(21) Appl. No.: 10/692,782

(22) Filed: Oct. 27, 2003

(65) Prior Publication Data

US 2005/0089335 A1   Apr. 28, 2005

Related U.S. Application Data

(63) Continuation of application No. 09/469,783, filed on Dec. 22, 1999, now Pat. No. 6,690,886.

(51) Int. Cl.
  *H04J 14/02* (2006.01)
  *H04B 10/12* (2006.01)
  *H04B 10/00* (2006.01)

(52) U.S. Cl. .................. 398/81; 398/147; 398/159; 359/337.5

(58) Field of Classification Search ............... 398/147, 398/148, 159, 81; 359/337.5
  See application file for complete search history.

(56) References Cited

U.S. PATENT DOCUMENTS 5,392,377 A * 2/1995 Auracher ..................... 385/24
6,021,245 A * 2/2000 Berger et al. ................ 385/123
6,154,588 A * 11/2000 Kai .............................. 385/27
6,392,769 B1 * 5/2002 Ford et al. ...................... 398/9
6,411,408 B1 * 6/2002 Dennis et al. ................ 398/92
6,650,842 B1 * 11/2003 Fee et al. .................... 398/147

* cited by examiner

*Primary Examiner*—M. R. Sedighian
(74) *Attorney, Agent, or Firm*—Borden Ladner Gervais LLP

(57) ABSTRACT

The invention is the novel use of dispersion compensation in a long haul wavelength division multiplexed high capacity optical transport system which has very many channels packed extremely closely together, in order to greatly reduce the deleterious effects of four-wave mixing. Four-wave mixing is an exchange of energy between nominally independent channels, arising from the fundamental fiber non-linearity, which has the effect of degrading transmission quality. Conventional systems make use of fiber dispersion compensating modules to overcome the effects of fiber dispersion. In such systems, it has been discovered that the exact distribution of fiber dispersion along the optical link (the 'dispersion map') strongly influences the degree of four-wave mixing, and hence the degradation in transmission quality. Furthermore, by carefully designing the dispersion map of the optical fiber link it is possible to significantly reduce the effects of four-wave mixing, allowing total system capacities and reaches to be achieved that would not otherwise be attainable. As the invention only requires the use of fiber dispersion compensating modules, the cost of implementing such a concept will not make much difference to the overall system cost.

14 Claims, 5 Drawing Sheets

SUPPRESSION OF FOUR-WAVE MIXING IN ULTRA DENSE WDM OPTICAL COMMUNICATION SYSTEMS THROUGH OPTICAL FIBRE DISPERSION MAP DESIGN

PRIORITY CLAIM

This application is a continuation of U.S. application Ser. No. 09/469,783, filed Dec. 22, 1999 which issued as U.S. Pat. No. 6,690,886.

FIELD OF THE INVENTION

This invention relates to very densely packed WDM transmission systems and, more particularly, to a method and apparatus for reducing the deleterious effects of four-wave mixing.

BACKGROUND OF THE INVENTION

Optical fibres are increasingly being used to replace wired communications such as twisted pair and coaxial cable, as well as to enable new applications which were previously impractical such as conveying millimeter wave signals over any significant distance. Optical fibre based systems have already found widespread application in digital signal transmission. More recently, the transmission of analog signals over optical fibres has grown in importance.

In the field of modern telecommunications, the emergence of fibre optics as the transmission system of choice can be attributed to two factors: the single mode fibre in these systems has virtually unlimited analog and digital signal bandwidth, and a life measured in decades. There are primarily three wavelengths that are used in fibre optic links. All are in the near-infrared portion of the electromagnetic spectrum. By far the dominant wavelengths in use at present are located in bands around 1310 and 1550 nm. The choice of these particular wavelength bands is based on the availability of certain desirable fibre properties, such as low attenuation (1550 nm) and zero wavelength dispersion (1310 nm).

A large proportion of the worldwide installed fibre base consists of conventional fibre that is optimised for near-zero dispersion in the second transmission window of 1310 nm. Current transmission systems operate in the third transmission window of 1550 nm, however, to take advantage of low-loss transmission and the availability of optical amplifiers.

If an optical signal is to travel over long distances, it is necessary to use amplifiers to strengthen the signal at intervals. These amplifiers are needed because, over long distances, the signal tends to fade, or attenuate and in the case of digital transmission each optical pulse tends to spread out from the more compact form in which it was transmitted. Before the development of optical amplifiers, the only way to boost an optical signal was to regenerate it electronically. That is, convert the optical signal to an electrical signal, amplify it, convert it back to an optical signal and then retransmit it. Optical amplifiers, although still generally requiring both electrical power to drive the pump lasers and electronic systems to provide stability and monitoring functions, are much less costly than electrical amplifiers because they do not have to regenerate the individual optical signals.

Optical amplifiers may be classified into two categories, namely laser-diode amplifiers and doped-fiber amplifiers. The latter are particularly attractive because of their ease of manufacture and simplicity of coupling into the fiber link. Erbium doped-fiber amplifiers (EDFAs), for example, are pieces of fibre that are doped with erbium, an element that can boost the power of an optical wavelength. In fact, it can simultaneously amplify all the wavelengths on a given fibre, and it may do so passively (i.e. without electrical power or electronic systems).

Most of the long-haul telecommunications traffic today is carried on synchronous optical networks. There is escalating pressure on global telecommunications networks to provide higher transmission capacity, achievable by increasing data transmission rates. Although this sounds attractive from a systems point of view, successful deployment of such systems depends on resolving a number of critical issues, foremost among them chromatic dispersion, which can introduce errors in the data stream if left unchecked.

Chromatic dispersion in lightwave systems is caused by a variation in the group velocity in a fibre with changes in optical frequency. A data pulse generally contains a spectrum of wavelengths introduced by modulation. Dispersion is a phenomenon that results from the fact that light of different wavelengths travels with different velocities through optical fibre. Since the speeds are different, wavelengths having higher velocity tend to move toward the front of the pulse, while wavelengths having a slower velocity move toward the rear. This causes the entire pulse to spread out, decreasing the clarity of the signal, and causing further problems (i.e. introduction of errors in the data) if the pulse is actually intermingled with other pulses.

Chromatic dispersion thus places a practical limit on the distance a signal can be transmitted before some form of compensation becomes necessary. At rates of 10 Gbit/s this distance is about 60 km, and at higher data rates the distance shortens. A number of solutions have been proposed to remedy this problem, including dispersion compensating fibre (DCF), chirped fibre gratings, mid-span spectral inversion, multilevel coding, and others. However, only dispersion-compensating fibre and chirped fibre gratings have been considered seriously as potential candidates for practical deployment.

When light of 1550 nm wavelength is used in conventional 1310 nm single mode transmission fibre, high levels of chromatic dispersion (approximately 17 ps/nm/km) are introduced. If erbium-doped fiber amplifiers (inherently analog devices) are employed, the chromatic dispersion accumulates, becoming the primary limiting factor to capacity. The simplest way to compensate for the total accumulated dispersion in a fibre link is to concatenate standard fibre with a fibre introducing high levels of dispersion of the opposite sign. This dispersion compensating fibre (DCF) compensates for the cumulative positive dispersion with its negative dispersion characteristic. DCF has a large negative chromatic dispersion at a wavelength of 1550 nm and is typically five to ten times as dispersive as conventional transmission fibre. A typical DCF, for example, has a dispersion value −100 ps/nm/km. For example, to 'completely' compensate for the dispersion introduced by an 80 km span, a system requires about 13 km of DCF. It should be noted here that 'complete' dispersion compensation doesn't necessarily mean zero net dispersion as many systems exploit the interplay between fiber dispersion and transmitter chirp to allow for additional reach. Complete compensation simply means the optimum degree of net dispersion to suit the particular transmitter incarnation chosen.

DCF also suffers from higher attenuation than conventional fibre. Over the long lengths required, the fibre introduces significant losses, typically 5 to 8 dB over an 80 km span. Therefore, additional optical amplifiers must be provided to compensate for this loss. Key components, then, in any long haul optical transport communications system are the optical amplifiers (e.g. EDFAs) and dispersion compensating modules (DCMs), of which DCF is only one realisation.

If carefully constructed, an optical fibre communication systems can provide low loss and very high bandwidth information carrying capacity. In practice the bandwidth of optical fibre may be utilised by transmitting many distinct channels simultaneously using different carrier wavelengths. The associated technology is called wavelength division multiplexing (WDM). The advent of wavelength division multiplexing as the technology of choice for upgrading the capacity of fibre-optic networks has created a demand for devices and components capable of pushing that capacity to its limit. For maximum upgrade flexibility, the fibre selected for a high capacity network should minimize optical non-linear effects, such as four-wave mixing and keep dispersion (pulse spreading) to a minimum.

The reach and capacity of unregenerated multichannel optical wavelength division multiplexed (WDM) transport systems are limited by the combined effects of dispersion, noise and fibre non-linearities. Current WDM products tend to have a relatively low channel count, which means that the channels can be spaced relatively widely (typically 100-200 GHz) within the gain window of erbium-doped fibre amplifiers (EDFAs). However, as the demand for bandwidth continues to grow, there is a need to provide more and more capacity over a single fibre, and one relatively simple way to achieve this is to reduce the channel spacing so that more channels can be packed within the EDFA gain window. However, when this is done, the crosstalk between channels due to interactions mediated by the fibre non-linearity increases, and eventually imposes a limitation on the maximum reach that can be achieved with a given channel spacing.

The non-linear effect responsible for this limit is four-wave mixing (FWM). This process is due to the fundamental non-linearity of the glass fibre transmission medium, and occurs when three photons (from two or three different wavelength channels) mix to produce a fourth photon at another wavelength. If the wavelength of this fourth photon coincides with that of another communication channel, it cannot be distinguished from the information in that channel and so constitutes unwanted crosstalk.

Therefore, the most significant limiting process in ultra dense WDM optical transmission systems is the high degree of crosstalk between channels due to FWM, and the reason for this effect dominating system performance is the small channel spacing used. This effect rapidly increases as one attempts to further reduce the channel spacing (and increase capacity and spectral efficiency). The FWM process, then, imposes a limitation on the maximum reach, capacity and spectral efficiency that can be achieved in a very densely packed WDM system.

Currently, the problems associated with four-wave mixing are controlled through system design. Specifically, this includes the use of relatively low channel counts, a relatively wide channel spacing and fibres with a reasonable degree of dispersion. The useable wavelength range for long haul high capacity transport is confined to the EDFA gain band. As more and more capacity is demanded of systems, it is extremely likely that channel counts will increase and channel spacings decrease (to achieve ever-increasing capacity on a fibre), rendering the aforementioned measures ineffective. Therefore, the system impact of four-wave mixing will likewise increase, and eventually will limit the maximum capacity and/or reach of dense WDM transport systems.

SUMMARY OF THE INVENTION

The invention is the novel use of dispersion compensation in a long haul wavelength division multiplexed high capacity optical transport system which has very many (400-2000) channels packed extremely closely together (e.g. 5-10 GHz channel spacing), in order to greatly reduce the deleterious effects of four-wave mixing. It has been discovered that the exact distribution of fibre dispersion along the optical link (the 'dispersion map') strongly influences the degree of four-wave mixing, and hence the degradation in transmission quality. In particular, by carefully designing the dispersion map of the optical fibre link it is possible to significantly reduce the effects of four-wave mixing, allowing total system capacities and reaches to be achieved that would otherwise have not been possible. It should be noted that the use of such a dispersion map may not provide the optimum net system dispersion. However, the inclusion of additional dispersion compensating modules at the end of a link allows for the conventional benefit of the use of dispersion compensation without reducing the beneficial effect of decreased four-wave mixing.

The invention, then, is the intentional design and use of a particular distribution of dispersion compensating modules in a wavelength-division multiplexed optical transport system in order to achieve a reduction or suppression of four-wave mixing. An important practical point is that its use does not preclude efficient optimisation of the net system dispersion as determined by the effects of fibre dispersion, other non-linear effects and transmitter chirp.

As the invention only requires the use of dispersion compensating modules (some realizations of which are currently commercially available and some being in development), an obvious advantage of the invention is that the cost of implementing such a scheme should not make much difference to the overall system cost. Therefore this invention is likely to be very important to the high capacity transport market.

Other aspects and features of the present invention will become apparent to those ordinarily skilled in the art upon review of the following description of specific embodiments of the invention in conjunction with the accompanying drawings.

DESCRIPTION OF THE PREFERRED EMBODIMENTS

Figure 1:
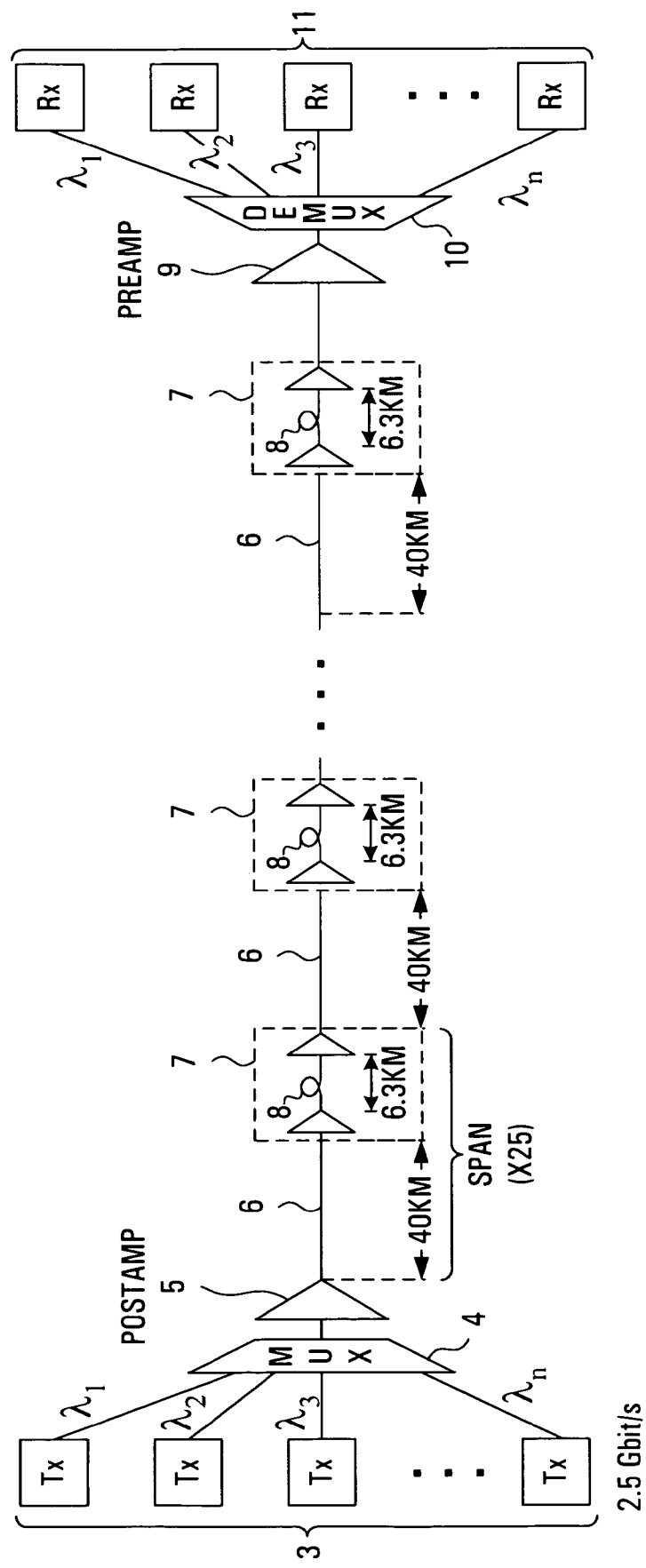
FIG. 1 illustrates the components and configuration of the transmit path in a typical WDM optical transport communications system.

Referring to FIG. 1, the transmit path of a typical dense wavelength division multiplexed (DWDM) system spanning approximately 1000 km is shown. An array of optical transmitters 3 is connected to an optical multiplexer 4, the output of which is fed through an optical post-amplifier (POSTAMP) 5 and into an optical link comprising a plurality of serial spans extending between the post-amplifier 5 and an optical pre-amplifier (PREAMP) 9. The output of optical pre-amplifier 9 is connected to an optical demultiplexer 10 which is, in turn, connected to an array of optical receivers 11. Each serial span in the link comprises a length of optical transmission fibre 6 followed by a dispersion compensating module (DCM) 8 buried within a two-stage optical line amplifier 7.

The transmitters 3 usually consist of high resolution (or narrowband) lasers transmitting in the 1550 nm wavelength band. Narrowband transmit lasers are important for allowing close channel spacing and for minimising the effects of other signal impairments which would otherwise limit the allowable distance before the signal must be regenerated. The function of the optical multiplexer 4 is to combine the transmit signals at different wavelengths onto the single optical transmission fibre 6. The demultiplexer 10, on the other hand, separates the combined signal into its component wavelengths at the receiver end of the link. Several technologies are currently used for optical multiplexing and demultiplexing, including thin-film dielectric filters and various types of optical gratings. Some multiplexers are even constructed as completely passive devices, meaning they require no electrical input. Most passive optical devices are reciprocal devices in that they function in the same manner when the direction of the light is reversed. Typically, the multiplexing and demultiplexing functions are provided by a single device at each end of the link, i.e. a WDM multiplexer/demultiplexer.

The optical post-amplifier 5 is a power amplifier generally included at the transmitter end of the link immediately following the multiplexer 4 in order to set the launched power of the multiplexed channels to the desired level, if this cannot be accomplished through adjustment of the transmitters alone. Optical line amplifiers 7, spaced at regular intervals, compensate for the attenuation caused by propagation over extended lengths of optical transmission fibre 6 by periodically boosting the signal. As shown in FIG. 1, the optical amplifiers 7 are preferably of two-stage design with the dispersion compensating modules 8 buried in the middle. As well as permitting the dispersion map to be controlled in both directions at the same time, this allows for the loss of the DCM to be compensated for and gives one control over the optical power launched into the DCM, which is important for fibre-type DCMs to control non-linearity. Other amplifier implementations are of course possible. For example, it may also be feasible to place the DCM immediately following the transmission fibre, with the amplifier placed after the DCM.

The dispersion compensating modules 8 in each span of FIG. 1 provides for the 'complete' dispersion compensation of the preceding transmission fibre 6 in the span. At present, commercial DCMs are of the fibre type. As mentioned, this dispersion compensating fibre (DCF) is typically five to ten times as dispersive as conventional transmission fibre. For example, to compensate for the dispersion introduced by a 40 km length of transmission fibre, the system would require about 6.3 km of DCF as shown in FIG. 1. In any case, differing values of dispersion compensation can be achieved by simply scaling the length of the DCF. However, it should be stressed that the DCM is not confined to being of the fibre type and, in the future, competing technologies such as fibre Bragg gratings may prove preferable.

Near the end of the link, and immediately preceding the optical demultiplexer 10, the optical pre-amplifier 9 is included to preamplify the optical signal before the receiver and to also overcome the insertion loss of the demultiplexer 10. And finally, the optical receivers 11 are responsible for detecting the incoming lightwave signals and converting them to appropriate electronic signals for processing by the receiving device. These optical receivers are very often wideband devices, i.e. able to detect light over a relatively wide range of wavelengths (1280-1580 nm). This is the reason why some seemingly incompatible devices can usually interoperate.

The underlying premise for the invention was discovered during the course of an investigation into high channel count systems. Simulations of a system consisting of 400 channels spaced by 10 GHz (occupying the conventional EDFA gain window) being transmitted over 1000 km were carried out. Noise and peak power considerations dictated an amplifier spacing of 40 km and, as a result, the system contained 25 individual spans. The information rate of each channel was 2.5 Gbit/s, giving a total system capacity of 1 Tbit/s. DCMs were included in the link in the conventional manner, to reduce the effects of fibre dispersion. Specifically, with regards to FIG. 1 and the particular system investigated, DCMs comprising 6.3 km lengths of dispersion compensating fibre (DCF) were used to provide for the complete dispersion compensation of each of the preceding 40 km transmission fibres. Again, it should be noted that complete compensation refers to the optimum degree of net dispersion to suit the particular transmitter configuration chosen. In the system investigated, this net dispersion value was zero.

It was found that the most significant limiting process in such a system (and in any ultra-dense WDM optical transmission system for that matter) is the high degree of crosstalk between channels due to four-wave mixing (FWM), and the reason for this effect dominating system performance is the small channel spacing used. As well, it was determined that this effect rapidly increases as one attempts to increase the capacity and spectral efficiency by further reducing the channel spacing. The FWM process, then, imposes a limitation on the maximum reach, capacity and spectral efficiency that can be achieved in a very densely packed WDM system. The invention was discovered in an attempt to reduce its effect and increase those maximum values.

The normalised FWM power as a function of channel wavelength was calculated for the 400 channels spaced by 10 GHz after propagation through the 25×40 km link with 6.3 km DCF modules at each line amplifier (providing for 'complete' dispersion compensation along the line). Further investigation revealed that it was possible to reduce FWM with certain dispersion maps. That is, the peak FWM power generated depends strongly on the dispersion map used for the link, and it is possible to significantly reduce the FWM power generated by only carrying out 'partial' dispersion compensation along the link and then adding extra DCMs at the end of the link to obtain the optimum degree of net dispersion which suits the particular transmitter realisation (i.e. to complete the compensation).

Figure 2:
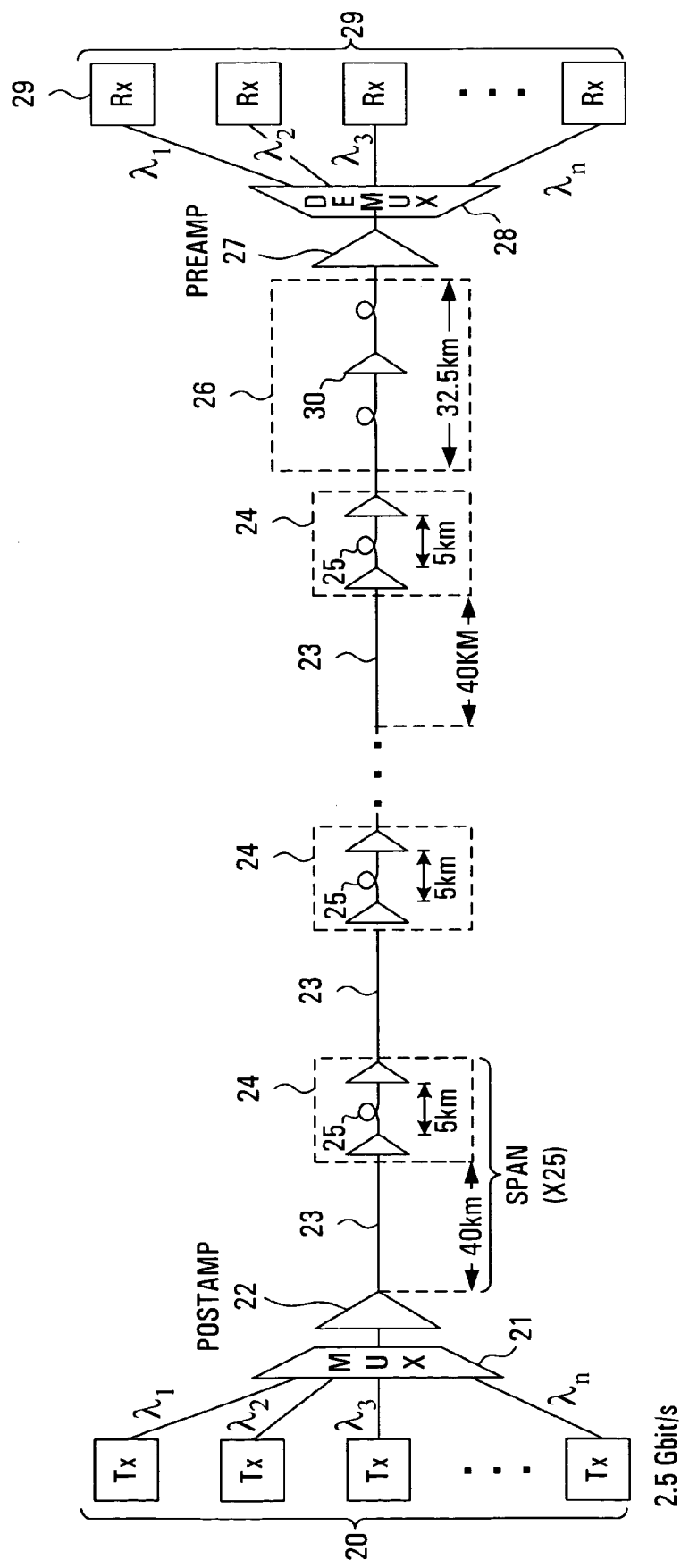
FIG. 2 illustrates the components and configuration of the transmit path in an ultra-dense WDM optical transport communications system according to the invention.

The normalised FWM power as a function of channel wavelength was calculated for the same system over a range of dispersion maps. FIG. 2 shows a realization of one such system. The components and configuration of the system are identical to FIG. 1 with the exception that the dispersion compensating fibre modules 25 buried within two-stage optical line amplifier 24 are now only 5 km in length, providing for 'partial' dispersion compensation of each preceding transmission fibre length 23, and an additional 32.5 km of DCF 26 has been included at the end of the link (immediately preceding the receiver preamplifier 27) to effectively complete the dispersion compensation. DCF has a higher loss per km than conventional fiber and, so, in order to include a 32.5 km length of DCF at the end of the link, it was necessary to use an additional optical amplifier 30 placed mid-way along its length as indicated in FIG. 2. The dispersion map of FIG. 2 has the same 'net' dispersion value as the previous system, but the peak FWM power is significantly reduced. It is interesting to note that the total length of dispersion compensating fibre used is equal for both FIGS. 1 and 2.

In conducting the investigation and as depicted in FIGS. 1 and 2, each serial span was considered to be identical. However, this is not a necessary condition and was just the simplest case used for modelling purposes. In fact, this implementation generally represents a worst-case for four-wave mixing, and some variation in span lengths (e.g. +/−3 km about the nominal span length of 40 km) is tolerable and may further reduce the effects of this nonlinear phenomenon. Advantageously, the invention also does not rely on any particular implementation of the dispersion compensating modules (DCMs) as it is the net value of dispersion that is important for successful operation of this system. Commercial DCMs are presently of the fibre type but, in the future, competing technologies such as fibre Bragg gratings may prove to be preferable. Of course, with regards to these alternate implementations, the dispersion characteristic of the DCM would be dictated by varying parameters other than the length (as in the case for the DCF implementation).

It is also quite feasible to mix DCMs with different dispersion characteristics provided there is no significant change in other parameters such as insertion loss or non-linearity. The only requirement is that the total dispersion of the transmission fibre minus the total dispersion of the DCMs should equal the optimum dispersion value for the transmitters used in the system. For the system investigated, this net dispersion value was zero, but it is quite possible that, for a different transmitter realisation in which chirp is exploited, the optimum net dispersion value may be non-zero.

Figure 4:
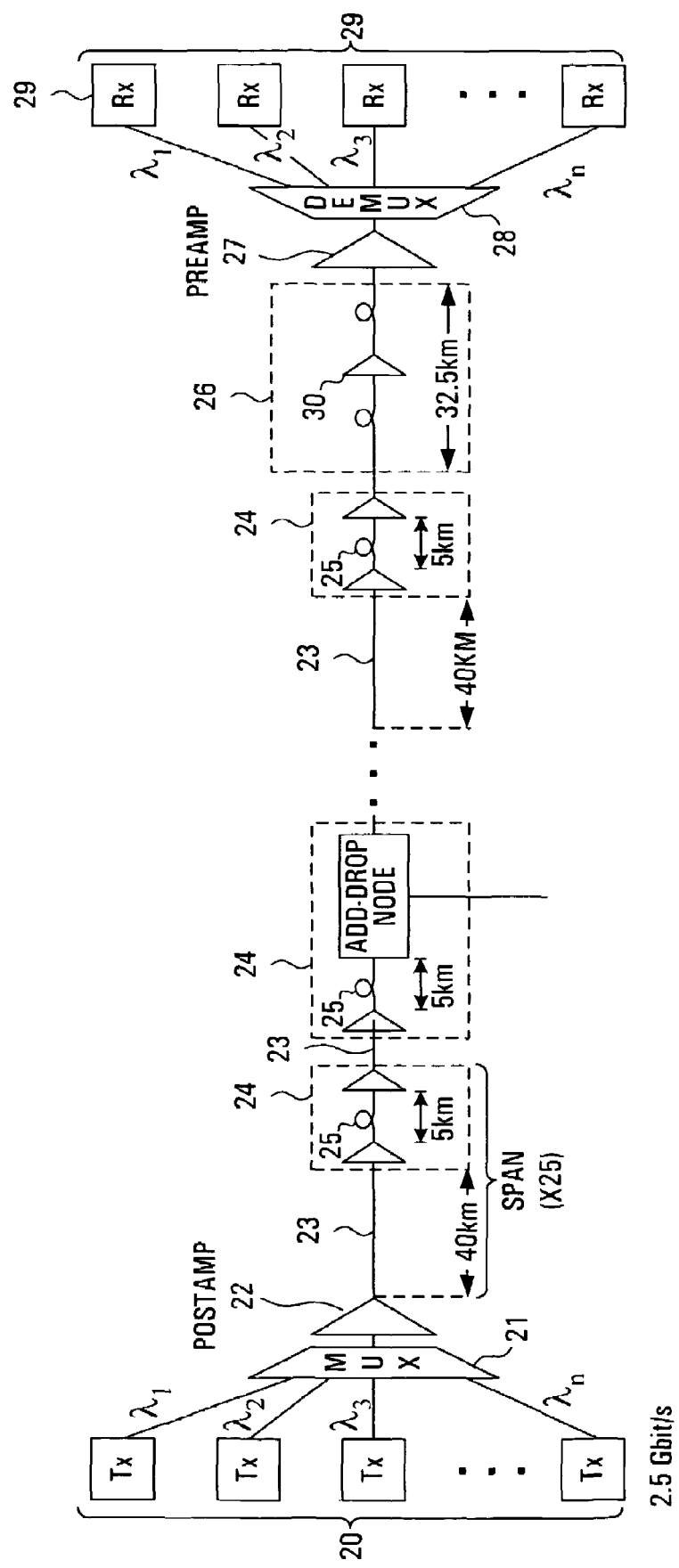
FIG. 4 illustrates the ultra-dense WDM optical transport communications system of FIG. 2, but further including an add-drop node.

FIG. 2 only illustrates the transmit path of a point-to-point link configured dense WDM system. In a bi-directional system (employing bi-directional amplifiers), the two counter-propagating signals would be split into two different physical paths at each optical amplifier and amplified independently before being combined and launched back into the transmission fibre. Current optical amplifiers are of a two-stage design with independent mid-stage access to the two counter-propagating optical signals between the two amplifier stages, thereby allowing for the correct degree of dispersion compensation to be applied to both directions of propagation. It is obvious, then, that the invention need not only apply to unidirectional systems. Furthermore, in some network configurations, it may be desirable to include channel add-drop facilities at various amplifier sites resulting in additional link termination points. These add-drop nodes are generally placed at amplifier sites to overcome the associated insertion loss. Regardless, it should be clear that the invention is not only restricted to point-to-point applications. See for example FIG. 4, in which the WDM optical transport communications system includes an add-drop node 40.

Figure 3A:
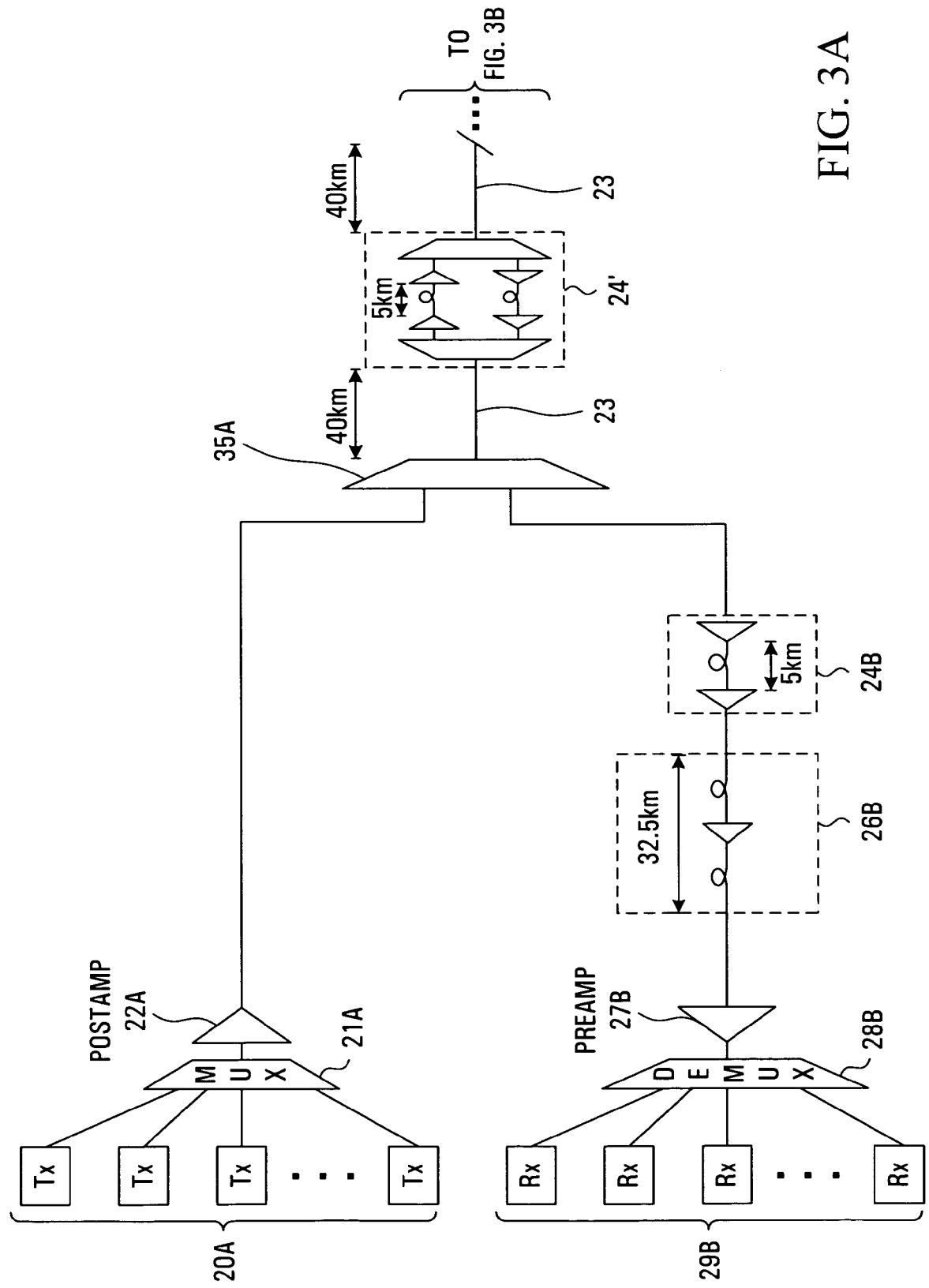
FIGS. 3A and 3B together illustrate the invention as applied to a bidirectional communication system.
Figure 3B:
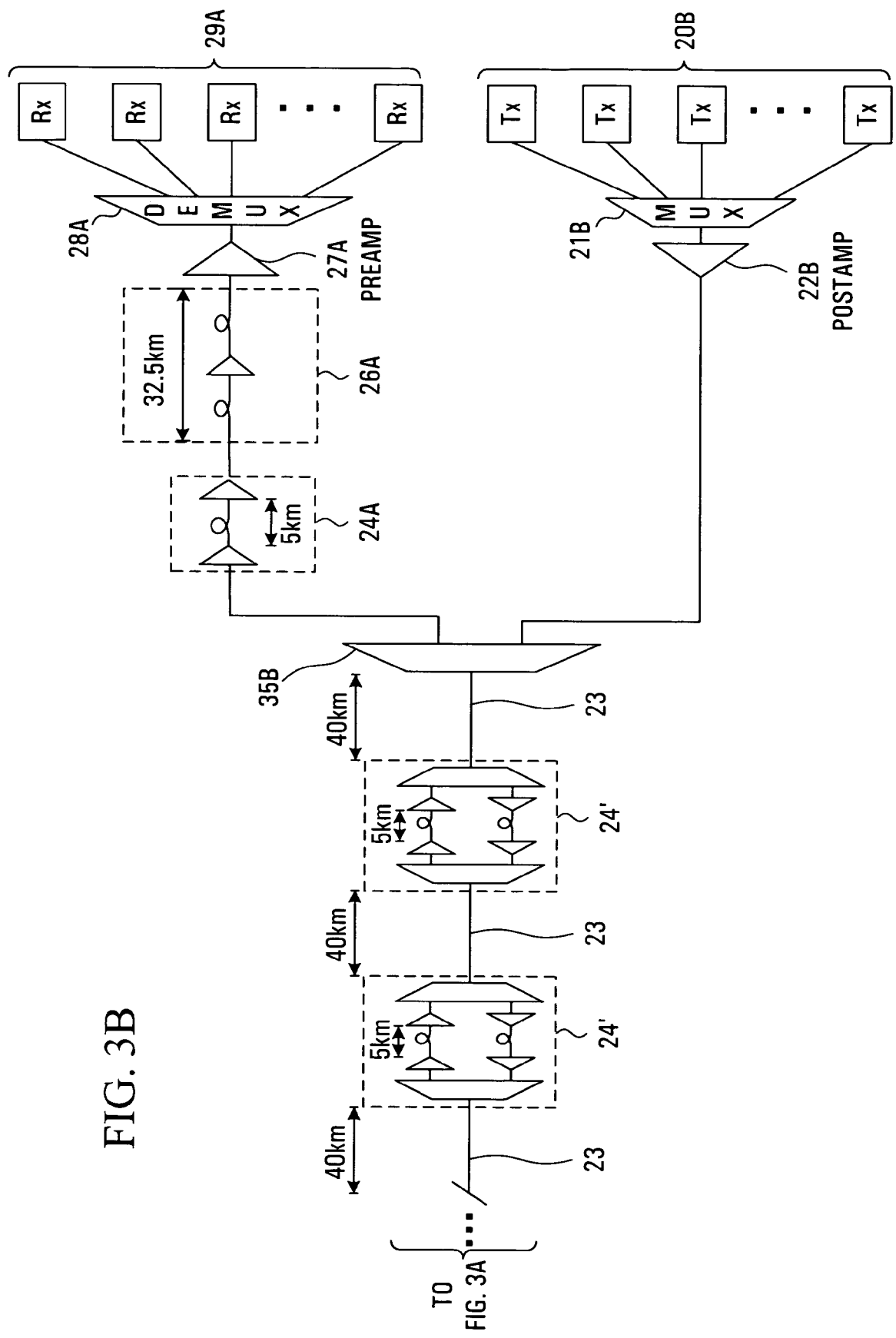

FIGS. 3A and 3B together illustrate a bidirectional system incorporating the invention. Thus, there is an array of transmitters 20A and 20B at each node rather than an array at only one node. Similarly, there is an array of receivers 29A and 29B at each node rather than an array at only one node.

Another difference is that an optical isolator (or other branching device) 35A is interposed between the POSTAMP 22A at transmitter array 20A and the first serial span in the transmission direction from the first node and a second optical isolator (or other branching device) 35B is interposed between the POSTAMP 22B at transmitter array 20B and the first serial span in the transmission direction from the second node.

The optical isolator 35A is also interposed at the junction of the last 40 km length of fibre 23 in the transmission direction from the second node and the following optical line amplifier module 24B. Similarly optical isolator 35B is interposed at the junction of the last 40 km length of fibre 23 in the transmission direction from the first node and the following line amplifier module 24A.

The final difference is that, except for the module 24A (24B) which is the last in the respective transmission direction all the other modules 24', i.e., all those located between the isolator 35A and isolator 35B, are each configured as bidirectional modules known per se in the art and having two unidirectional parallel branches each containing a 5 km length of dispersion fibre and two optical amplifiers.

It can be seen that tracing the transmit path from either end of the bidirectional configuration the transmission link comprises a plurality of serial spans extending between a multiplexer 21A (21B) and a demultiplexer 28A (28B).

Again, each span comprises a 40 km length of optical transmission fibre 23, a DCM formed by a 5 km dispersion compensating fibre and an optical amplifier. Also, in common with FIG. 2, following the last span in the transmission direction there is located a further DCM in the form of a 32.5 km dispersion compensating fibre 26A (26B).

As described earlier, four-wave mixing in optical fibre is a physical process in which both total photon energy and momentum are conserved. Momentum conservation requires that a particular phase relationship should exist between all four waves for maximum four-wave mixing (FWM) efficiency ("phase matching"). By changing the dispersion distribution along the fibre link, and particularly at each line amplifier where the signal power (and hence non-linearity) is highest, this phase-matching condition is disturbed resulting in a decrease in efficiency of the FWM process. The reduction in FWM power for the system of FIG. 2 is due, therefore, to reduced phase matching between the contributing waves resulting in reduced crosstalk and better transmission quality.

Specifically, to design the optimum dispersion map for a system numerical simulation tools may be employed, as is currently done to calculate link budgets. Firstly, a number of system parameters such as number of channels, channel spacing, amplifier spacing, fibre type, signal power etc. are determined in the normal way, and then simulations over a range of dispersion maps are performed. This will yield the optimum distribution of dispersion compensating modules (DCMs) which minimises the effects of four-wave mixing and maximises system performance. The specific configuration described and depicted in FIG. 2 is the result of trial-and-error simulations carried out in this manner.

Summarizing then, in long-haul dense WDM systems, the exact distribution of fibre dispersion along the optical link (the 'dispersion map') strongly influences the degree of four-wave mixing, and hence the degradation in transmission quality. Furthermore, by carefully designing the dispersion map of the optical fibre link it is possible to significantly reduce the effects of four-wave mixing, allowing total system capacities and reaches to be achieved that would not otherwise be possible. The use of such a dispersion map may not provide the optimum 'net system' dispersion. However, the inclusion of additional dispersion compensating modules at the end of a link allows for the conventional benefit of the use of dispersion compensation without reducing the beneficial effect of decreased four-wave mixing.

Major players in the high capacity transport market are currently actively pursuing development programs to increase the capacity of their respective products, spurred on by the huge increase in demand from existing and new-entrant carriers. This invention has the potential to allow system capacities and reaches that would not otherwise be attainable, and as such, is paramount to the high capacity transport market. As the invention only requires the use of dispersion compensating modules (some realisations of which are currently commercially available and some being in development), the cost of implementing such a scheme should not make much difference to the overall system cost.

While preferred embodiments of the invention have been described and illustrated, it will be apparent to one skilled in the art that numerous modifications, variations and adaptations may be made without departing from the scope of the invention as defined in the claims appended hereto.

The invention claimed is:

1. A multichannel optical wavelength division multiplexed (WDM) transmission system for connecting between a multiplexer and a demultiplexer, the system comprising a plurality of serial spans extending between the multiplexer and the demultiplexer, wherein a first span is arranged to be connected to the multiplexer and each span comprises a length of optical transmission fibre, a dispersion compensating module (DCM), and an optical amplifier, the properties of the DCM being selected to suppress four-wave mixing rather than to provide complete chromatic dispersion compensation of the respective span, and wherein located immediately following a last span and connected thereto and preceding the demultiplexer for connection thereto is a further DCM having properties selected to substantially complete the chromatic dispersion compensation over the total length of the spans.

2. A transmission system according to claim 1 wherein the optical amplifier in each serial span is of a two-stage design with the DCM placed between the two amplifier stages.

3. A transmission system according to claim 1 wherein each DCM and the further DCM comprises a length of dispersion compensating fibre (DCF).

4. A transmission system according to claim 3 wherein the dispersion value of the DCFs is fixed and the length of each DCF is selected to suppress four-wave mixing or to complete the dispersion compensation as the case may be.

5. A transmission system according to claim 4 wherein the DCF in each serial span is of substantially equal length.

6. A transmission system according to claim 3 wherein an optical amplifier is interposed along the length of dispersion compensating fibre which serves as the further DCM.

7. A transmission system according to claim 1 wherein the dispersion value of the DCMs is fixed and the characteristics of each DCM are selected to suppress four-wave mixing or to complete the dispersion compensation as the case may be.

8. A transmission system according to claim 1, wherein there is a high number of channels packed extremely closely together.

9. A transmission system according to claim 8, wherein there are 400-2000 channels at a spacing of 5-10 GHz.

10. A transmission system according to claim 1 wherein the DCM in each span and the further DCM comprises a fibre Bragg grating.

11. A transmission system according to claim 1 wherein at least one span contains a channel add-drop node.

12. A transmission system according to claim 1 wherein an optical post-amplifier immediately follows the multiplexer and an optical pre-amplifier immediately precedes the demultiplexer.

13. A multichannel optical wavelength division multiplexed (WDM) transmission network comprising a plurality of serial spans forming a link between at least two nodes of the network, wherein each serial span comprises a length of optical transmission fibre, a dispersion compensating module (DCM), and an optical amplifier, at least one span containing a channel add-drop node, the properties of the DCM being selected to suppress four-wave mixing rather than to provide complete chromatic dispersion compensation of the respective span, and wherein a region immediately following the last span in the link comprises a DCM having properties selected to substantially complete the chromatic dispersion compensation over the total length of the link.

14. A method of compensating for chromatic dispersion and four-wave mixing in a multichannel optical wavelength division multiplexed (WDM) transmission system comprising a plurality of serial spans, the method comprising deliberately compensating in each span only partially for the chromatic dispersion introduced in that span such that four-wave mixing is reduced, and providing a final compensating step at the end of the spans in which the cumulative chromatic dispersion introduced by all the spans is substantially completely compensated for.

* * * * *